Patented June 30, 1942

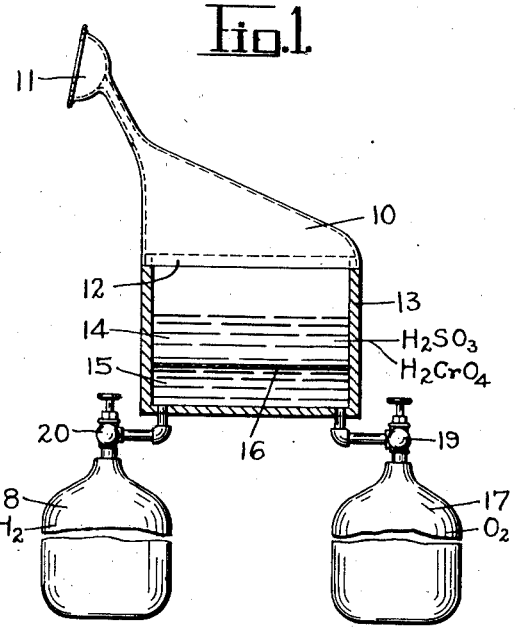
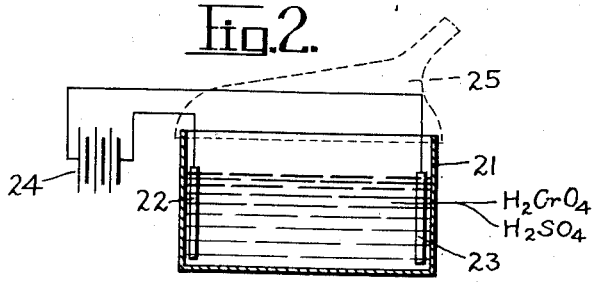
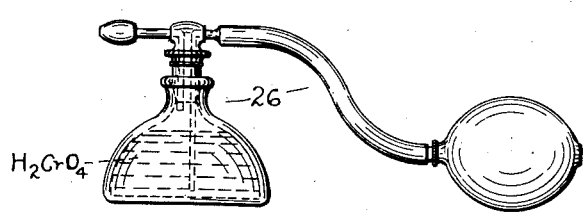

2,288,416

UNITED STATES PATENT OFFICE 2,288,416

APPARATUS FOR THE TREATMENT OF HAY FEVER

Eugene V. O'Neill, Waterbury, Conn.

Application October 30, 1940, Serial No. 363,505

3 Claims. (Cl. 128—172)

This invention relates to apparatus for the treatment of respiratory ailments and more particularly for the relief of hayfever, asthma, and bronchitis.

One object of this invention is to provide an apparatus and method for producing a vaporous mixture of hydrogen, oxygen, sulphur dioxide, with chromic acid particles suspended therein for inhalation.

A still further object of this invention is to provide an apparatus of the above nature which will be relatively inexpensive to manufacture, simple in construction and operation, compact in size, and very efficient and durable in use.

With these and other objects in view, which will appear as the description proceeds, there have been illustrated in the accompanying drawing several forms in which the invention may be conveniently embodied in practice.

In the drawing:

Figure 1 is a view, partly in section, of one form of apparatus embodying the invention.

Figure 2 is a sectional view of another form of the invention, in which the vaporous mixture is produced by electrolysis of an acidified solution of chromic acid.

Figure 3 illustrates a third form of apparatus also embodying the invention.

Referring now to the drawing wherein like reference numerals designate like parts throughout the several views, the numeral 10 denotes a hood having an inhaling mouthpiece 11 at the top thereof, the bottom end 12 of said hood being flared and fitted tightly over a container 13. The container 13 contains an aqueous solution comprising a mixture of sulphurous acid ($H_2SO_3$) and chromic acid ($H_2CrO_4$) the active ingredient of which is chromic oxide ($CrO_3$). The container is divided into upper and lower compartments 14 and 15 which are separated by a wire mesh screen 16. A tank 17 of oxygen ($O_2$) under pressure is connected to one side of the lower compartment 15 as is also a tank 18 of hydrogen ($H_2$); suitable manually-operated valves 19 and 20, respectively, are provided to control the flow of these gases from said tanks 17 and 18 to the lower compartment 15.

In operation, when the valves 19 and 20 are opened slightly, a small stream of oxygen and hydrogen gases will be permitted to enter the compartment 15 and pass upwardly through the screen 16 in the form of very small bubbles which will rise through the solution in the container 13 and produce a vaporous mixture above said solution composed of free hydrogen, free oxygen, and sulphur dioxide. A minute quantity of chromic acid will also be mechanically entrained in said vaporous mixture which may be inhaled by the patient through the mouthpiece 11, causing said vaporous mixture to attack and destroy any germs of hayfever or other respiratory ailments which may be present in the mouth, throat, bronchial tubes, nose and sinus cavities. The vaporous mixture may also be inhaled directly from the top of the tank without using the hood 10, if desired.

Second form

In the modified form of apparatus, shown in Figure 2, the curative vaporous mixture is obtained by electrolysis. This apparatus includes an open tank 21 having an aqueous solution of chromic acid 100 parts and a small amount, 1 part, of sulphuric ($H_2SO_4$) therein. Direct current from any desired source, such as a battery 24, is then passed through this solution from an anode 22 to a cathode 23, producing a vaporous mixture of hydrogen, oxygen, sulphur dioxide, water vapor, and a small quantity of chromic acid mechanically suspended in the form of a fine mist. This vaporous mixture may be then inhaled by the use of a hood 25, as indicated in dotted lines in Figure 2, said hood preferably being similar to the hood 10 shown in Figure 1. A current density of at least 15 amperes per square foot has been found to produce the most beneficial results.

Third form

In the treatment of some respiratory ailments, it has been found that the vapor produced by passing air through a solution of chromic acid and water may be blown directly into the throat or nose of the patient using a special form of air spray 26 apparatus as shown containing an aqueous solution of chromic acid, as illustrated in Figure 3.

While there have been disclosed in this specification several forms in which the invention may be embodied, it is to be understood that these forms are shown for the purpose of illustration only, and that the invention is not to be limited in various other forms without departing from its spirit. In short, the invention includes all the modifications and embodiments coming within the scope of the following claims.

Having thus fully described the invention, what is claimed as new and for which it is desired to secure Letters Patent, is:

1. In an apparatus for treating hayfever and other respiratory ailments, an electrolytic tank containing an aqueous solution of chromic acid and sulphuric acid and a pair of electrodes, means for passing electric current through said solution to cause gases to be generated at said electrodes which will pass upwardly through said solution and entrain a small quantity of chromic acid and sulphur dioxide in the form of a fine mist, and means to collect said gases from the space above said solution and conduct them to an inhaling apparatus for administering them to the patient undergoing treatment.

2. In an apparatus for treating respiratory ailments, a tank containing a solution of chromic acid and an anode and a cathode, means for passing electric current through said solution at such a current density as to produce gases at said anode and cathode which will rise above the solution and entrain a small quantity of chromic acid therewith as a fine mist, and an inhaling apparatus for administering to a patient the vaporous mixture arising from said tank.

3. In an apparatus for the treatment of hay-fever and other respiratory ailments, a receptacle containing a solution of chromic acid, means to cause a gas to rise through said solution in such a manner that it will mechanically entrain a small quantity of fine chromic acid particles therein in the form of a mist, and means for administering said gas with its entrained chromic acid particles by inhalation to the respiratory tract of a patient.

EUGENE V. O'NEILL.